US006779942B2

(12) United States Patent
Lipp et al.

(10) Patent No.: US 6,779,942 B2
(45) Date of Patent: Aug. 24, 2004

(54) CONTROL SHAFT AND KNOB ASSEMBLY OF AN APPLIANCE TIMER

(75) Inventors: Ellis P. Lipp, Charlottesville, IN (US); Benjamin F. Chestnut, Avon, IN (US)

(73) Assignee: Emerson Electric Company, St. Louis, MO (US)

( * ) Notice: Subject to any disclaimer, the term of this patent is extended or adjusted under 35 U.S.C. 154(b) by 547 days.

(21) Appl. No.: 09/758,641

(22) Filed: Jan. 12, 2001

(65) Prior Publication Data

US 2002/0094232 A1 Jul. 18, 2002

(51) Int. Cl.$^7$ ................................................ B25G 3/18
(52) U.S. Cl. .................... 403/329; 403/11; 403/315; 403/319
(58) Field of Search ........................... 403/11, 315, 319, 403/328, 329, 397

(56) References Cited

U.S. PATENT DOCUMENTS

| 4,611,103 A | 9/1986 | Eder et al. |
| 5,684,281 A | 11/1997 | Amonett |
| 6,213,677 B1 * | 4/2001 | Yamane et al. ............. 403/329 |

* cited by examiner

Primary Examiner—Daniel P. Stodola
Assistant Examiner—Victor Mac Arthur
(74) Attorney, Agent, or Firm—Maginot, Moore & Beck

(57) ABSTRACT

A control shaft and knob assembly includes a control knob having a slot defined therein. The assembly also includes a control shaft which (i) has a bore extending therethrough, (ii) includes a spring arm which is positionable within the slot of the control knob, and (iii) has an opening defined therein. The assembly further includes a locking pin having a first retention member secured thereto. The locking pin is positionable in the bore of the control shaft. When the locking pin is positioned in the bore of the control shaft (i) the locking pin is positioned to inhibit inward deflection of the spring arm, and (ii) the first retention member is received into the opening of the control shaft. A method of securing a control knob to a control shaft of an appliance timer is also disclosed.

17 Claims, 6 Drawing Sheets

CONTROL SHAFT AND KNOB ASSEMBLY OF AN APPLIANCE TIMER

TECHNICAL FIELD OF THE INVENTION

The present invention relates generally to an appliance timer, and more particularly to an apparatus and method for securing a control knob to a control shaft an appliance timer.

BACKGROUND OF THE INVENTION

Appliance timers are commonly used in many household appliances, such as dishwashers, clothes washers, and clothes dryers. The appliance timer controls operation of the appliance by actuating and deactuating a number of switch assemblies which start and stop various work functions within the appliance such as a rinse function in the case of a clothes washer. The switch assemblies within the appliance timer are actuated and deactuated as a result of interaction between a number of a cam surfaces defined in a camstack of the appliance timer and a number of cam followers which are respectively associated with the switch assemblies. The camstack may be manually positioned to actuate and deactuate the switch assemblies associated with a particularly desired work function by rotating a control knob, which is typically located on the front of the appliance.

A control shaft couples the control knob to the camstack such that the camstack may be rotated in a direction corresponding to the rotation of the control knob by a user. As such, a locking mechanism is typically utilized to lock or otherwise secure the control knob to the control shaft.

One such locking mechanism for securing the control knob to the control shaft includes a locking pin which is friction fit into an axial bore defined in the control shaft. The locking pin forces the tips of the control shaft outwardly against the sides of a recess defined in the control knob. The force applied by the tips of the control shaft against the control knob effectively secure the control knob to the control shaft.

Such a design has a number of drawbacks associated therewith. For example, difficulties may arise during the assembly of an appliance timer which includes such a locking mechanism. In particular, due to manufacturing variations, the geometry of the locking pin may deviate from its intended design thereby rendering the locking pin difficult to install. Moreover, the force necessary to insert the locking pin into the control shaft may vary due to such a variation of the geometry of the locking pin thereby potentially preventing the locking pin from being fully "seating" in the control shaft. In either case, the control knob may not be properly secured to the control shaft thereby necessitating rework or repair during the manufacturing process.

What is needed therefore is an apparatus and method for securing a control knob to a control shaft which overcomes one or more of the aforementioned drawbacks. What is further needed is an apparatus and method for securing a control knob to a control shaft which allows for the reliable attachment of the knob to the shaft irrespective of typical manufacturing variations.

SUMMARY OF THE INVENTION

In accordance with one embodiment of the present invention, there is provided a control shaft and knob assembly. The assembly includes a control knob having a slot defined therein. The assembly also includes a control shaft which (i) has a bore extending therethrough, (ii) includes a spring arm which is positionable within the slot of the control knob, and (iii) has an opening defined therein. The assembly further includes a locking pin having a first retention member secured thereto. The locking pin is positionable in the bore of the control shaft. When the locking pin is positioned in the bore of the control shaft (i) the locking pin is positioned to inhibit inward deflection of the spring arm, and (ii) the first retention member is received into the opening of the control shaft.

In accordance with another embodiment of the present invention, there is provided a control shaft and knob assembly. The assembly includes a control knob having a slot defined therein. The assembly also includes a control shaft which (i) has a bore extending therethrough, (ii) includes a spring arm which is positionable within the slot of the control knob, and (iii) has a recess defined therein. The assembly further includes a locking pin having a first retention member secured thereto. The locking pin is positionable in the bore of the control shaft. When the locking pin is positioned in the bore of the control shaft (i) the locking pin is positioned to inhibit inward deflection of the spring arm, and (ii) the retention member is received into the recess of the control shaft.

In accordance with yet another embodiment of the present invention, there is provided a method of securing a control knob to a control shaft. The method includes the step of advancing a spring arm of the control shaft into a slot of the control knob. The method also includes the step of advancing a locking pin through a bore defined in the control shaft until (i) an end portion of the locking pin extends out of the bore and is located at a position in which the end portion of the locking pin inhibits inward deflection of the spring arm, and (ii) a first retention member which is secured to the locking pin extends into an opening defined in the control shaft.

It is therefore an object of the present invention to provide a new and useful apparatus for securing a control knob to a control shaft of an appliance timer.

It is a further object of the present invention to provide an improved apparatus for securing a control knob to a control shaft of an appliance timer.

It is moreover an object of the present invention to provide a new and useful method of securing a control knob to a control shaft of an appliance timer.

It is yet further an object of the present invention to provide an improved method of securing a control knob to a control shaft of an appliance timer.

It is moreover an object of the present invention to provide an apparatus for securing a control knob to a control shaft of an appliance timer that provides for ease of manufacture relative to heretofore designed appliance timers.

The above and other objects, features, and advantages of the present invention will become apparent from the following description and the attached drawings.

DETAILED DESCRIPTION OF THE INVENTION

Figure 1:
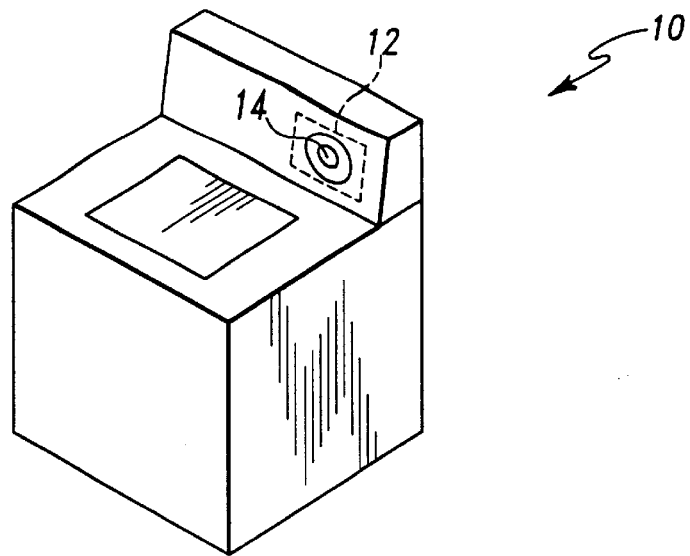
FIG. 1 is a perspective view of an appliance which includes an appliance timer which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
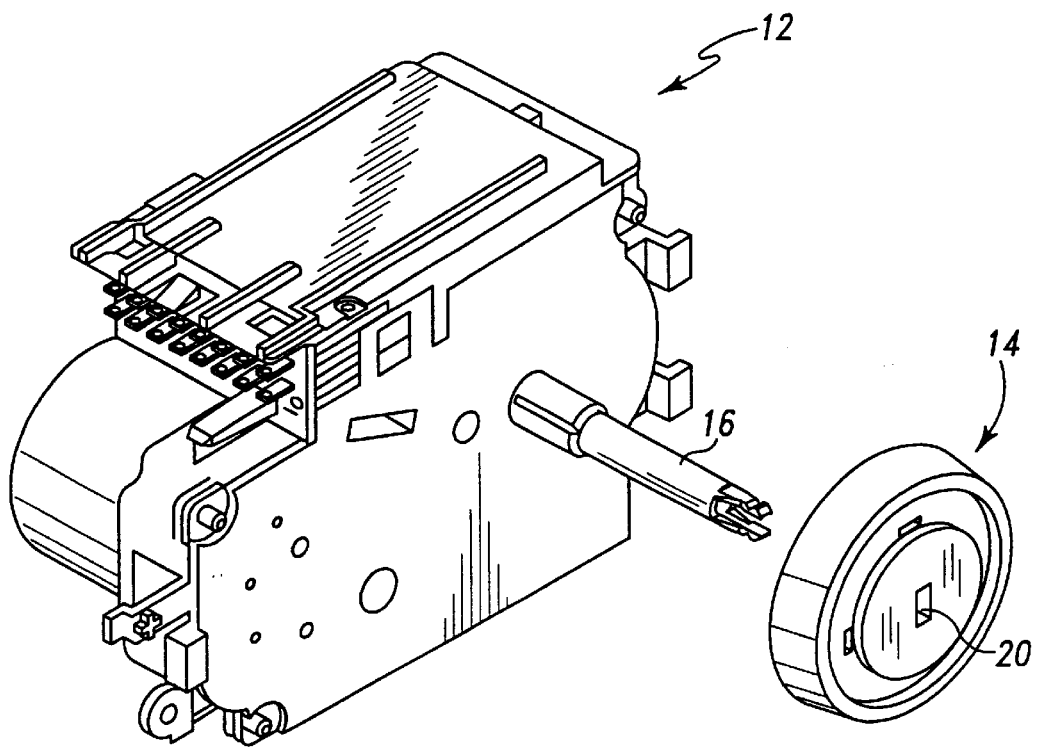
FIG. 2 is a perspective view of the appliance timer of FIG. 1.
Figure 3:
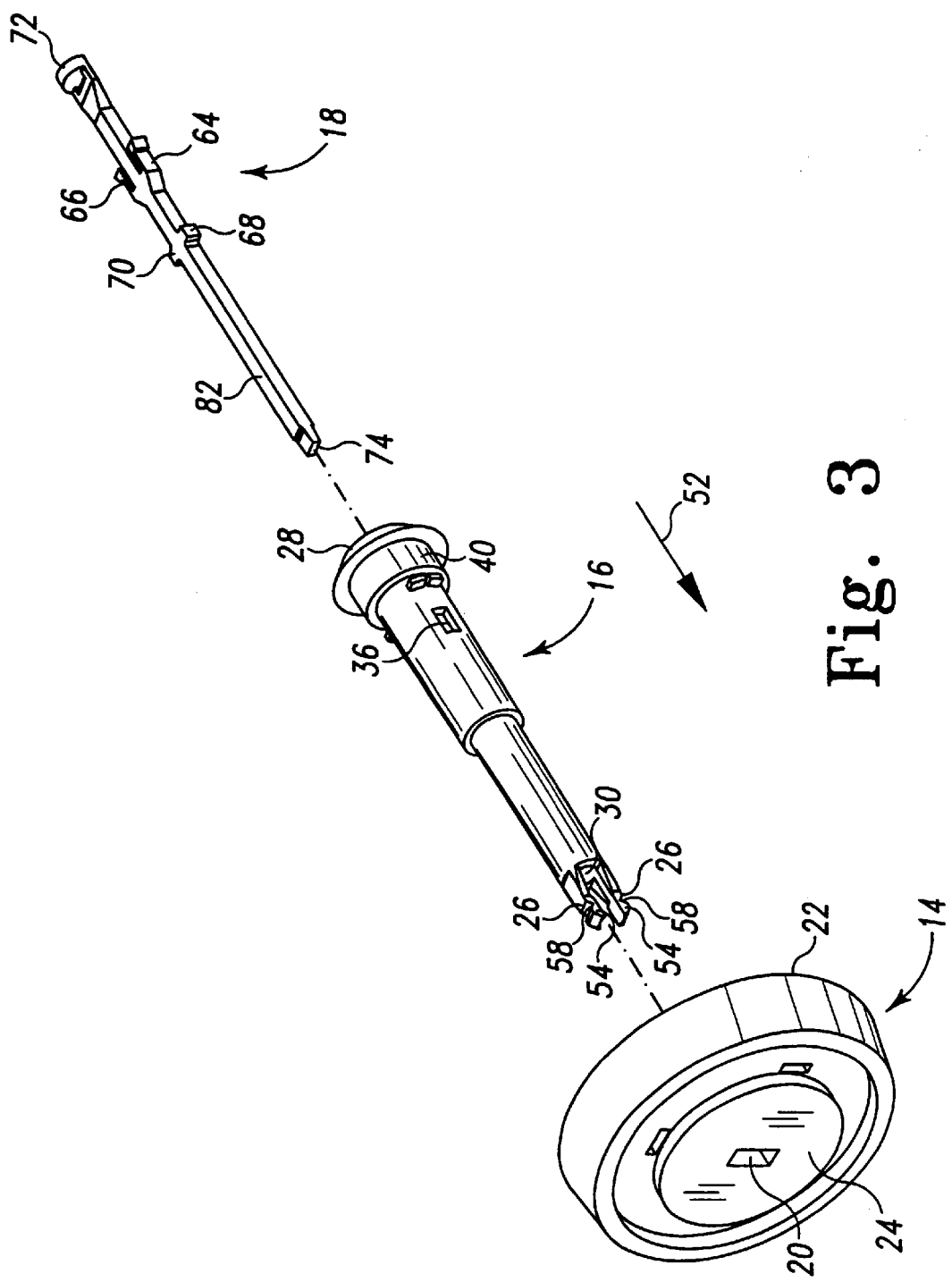
FIG. 3 is an exploded perspective view which shows the control knob, the control shaft, and the locking pin of the appliance timer of FIG. 2.
Figure 4:
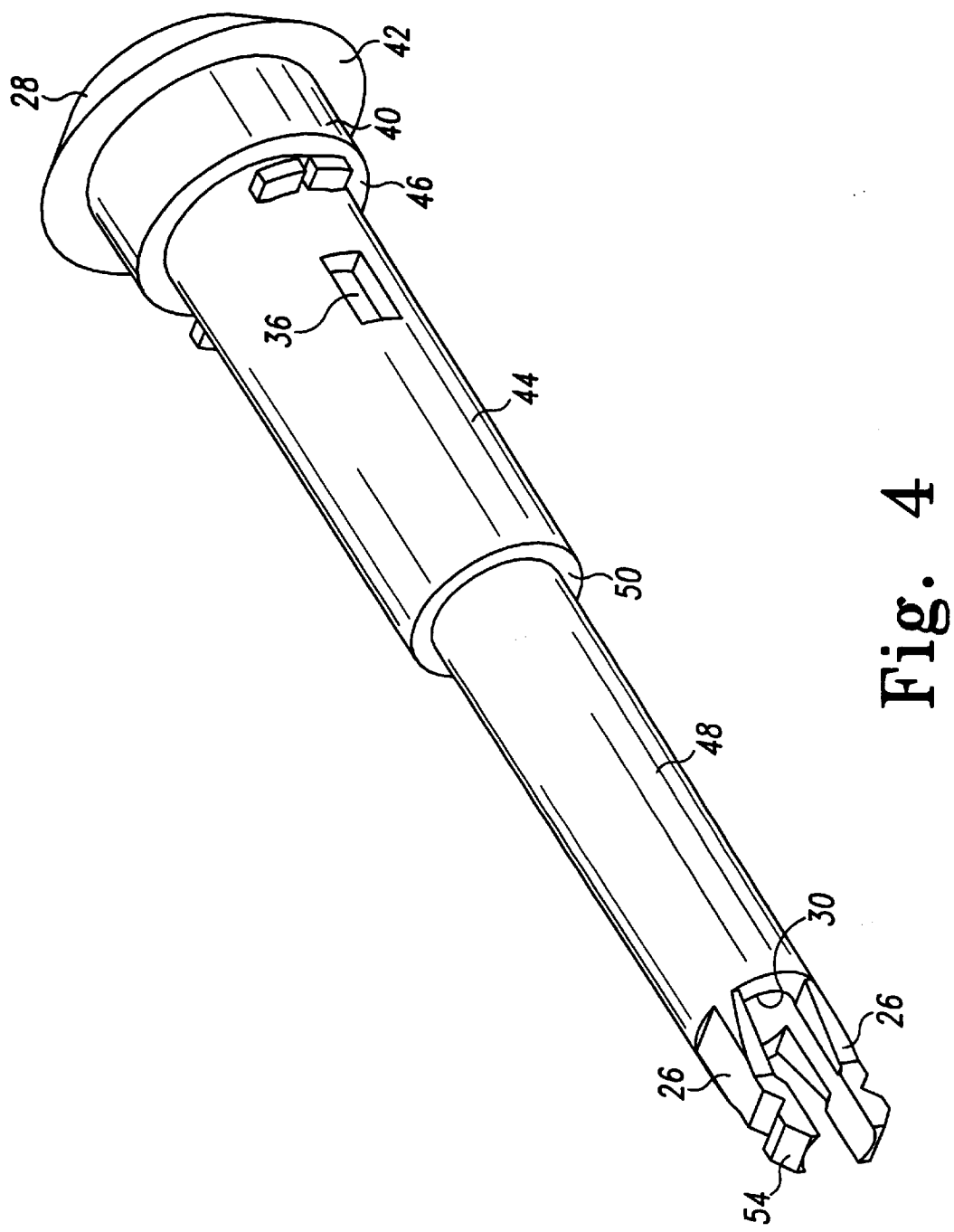
FIG. 4 is an enlarged perspective view of the control shaft of FIG. 3.
Figure 5:
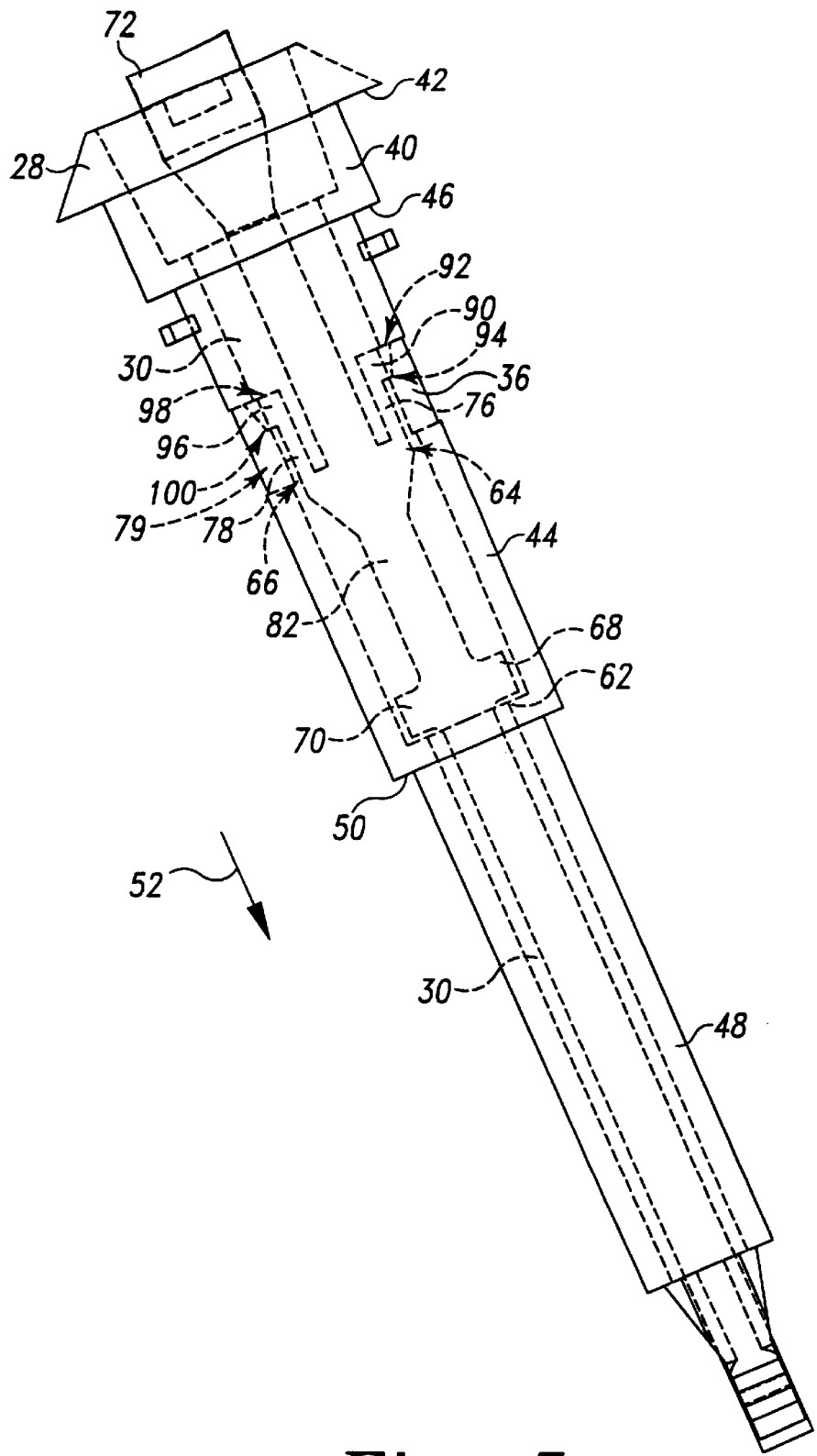
FIG. 5 is a perspective view which shows the locking pin of FIG. 3 positioned within the elongated bore of the control shaft of FIG. 3.
Figure 6:
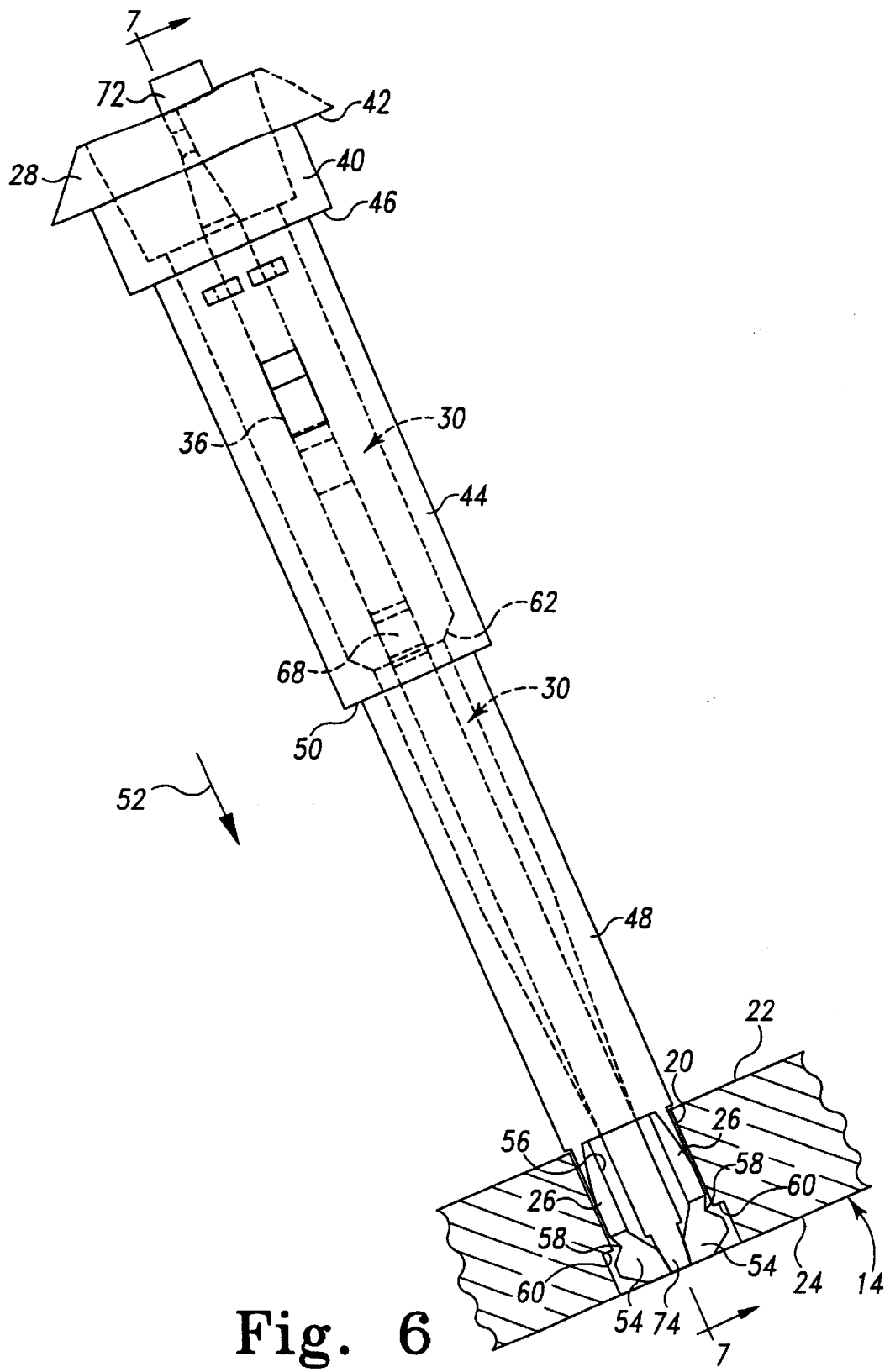
FIG. 6 is a view similar to FIG. 5, but showing (i) the assembly of the control shaft and the locking pin rotated 90°, and (ii) the control knob secured to the control shaft.

Referring now to FIG. 1, there is shown an appliance 10 which is a clothes washing machine. The appliance 10 includes an appliance timer 12 shown in FIG. 2. A control knob 14 is secured to a control shaft 16 extending from the appliance timer 12. The control shaft 16 allows the appliance timer 12 to be positioned inside the appliance 10 while the control knob 14 is positioned outside the appliance 10. Therefore, an operator may rotate the appliance timer 12 into a desired position by rotating the control knob 14.

Referring now to FIGS. 3–6, there is shown a control knob 14, a control shaft 16, and a locking pin 18. The control knob 14 has a backside 22 and a front side 24. A slot 20 is defined in the control knob 14 and extends from the backside 22 through the control knob 14 to the frontside 24. Additionally, the slot 20 is rectangular shaped. Control knob seats 60 are located at the two ends of the slot 20 to receive the spring arms 26 of the control shaft 16.

The control shaft 16 includes a control shaft base end 28, a shaft bore 30, and spring arms 26. The control shaft 16 locates the control shaft base end 28 at one end and the spring arms 26 at the opposite end. Three cylindrical shaped sections extend from the control shaft base end 28 to the spring arms 26.

The first cylindrical shaped section 40 is located adjacent to the control shaft base end 28. The diameter of the first cylindrical shaped section 40 is smaller than the diameter of the control shaft base end 28, thus creating a first edge 42.

A second cylindrical shaped section 44 is adjacent to the first cylindrical shaped section 40 and has a slightly smaller diameter than the first cylindrical shaped section, thus creating a second edge 46. The second cylindrical shaped section 44 has an opening 36 defined in the side thereof which extends from the surface of the second cylindrical shaped section 44 to the bore 30 of the control shaft 16. This opening 36 receives a first spring member 76 of the locking pin 18. Although this first embodiment of the present invention has one opening 36 defined in the second cylindrical shaped section 44, another embodiment could include a second hole (shown in phantom in FIG. 5) defined in the second cylindrical section 44 to receive the second spring member 78. Moreover, although the opening 36 is herein described as extending all the way through the side of the control shaft 16 (i.e. so as to extend from the outer surface of the second cylindrical shaped section 44 to the bore 30 of the control shaft 16), and has significant advantages thereby in the present invention, certain of such advantages may be achieved by other configurations of the opening 36. For example, the opening 36 may extend into the inner sidewall of the control shaft 16 (i.e. the surface into which the shaft bore 30 is defined) by a depth which does not cause the opening 36 to extend all the way through the sidewall to the outer surface of the control shaft 16 (i.e. the opening 36 would not be visible from the "outside" of the control shaft 16). Such a configuration of the opening 36 is contemplated for use in the present invention and is therefore intended to be within the meaning of the term "opening" as utilized herein.

The third cylindrical shaped section 48 is located adjacent to the second cylindrical shaped section 44 and has a slightly smaller diameter than the second cylindrical shaped section 44, thus creating a third edge 50. The third edge 50 limits the distance the control shaft 16 will travel in the axial direction 52 when the control knob 14 is pulled outward in order to start the appliance timer 12. Two spring arms 26 extend from the end of the third cylindrical shaped section 48 opposite to the second cylindrical shaped section 44. The spring arms 26 extend axially outward from the third cylindrical shaped section 48. Spring arm barbs 54 are secured to the ends of both spring arms 26 such that the space 56 defined between the spring arm barbs 54 is rectangular shaped. Additionally, a v-shaped notch 58 is defined in the spring arm barbs 54. The v-shaped notch 58 creates a surface area that will overlap the seats 60 of the control knob 14.

Figure 7:
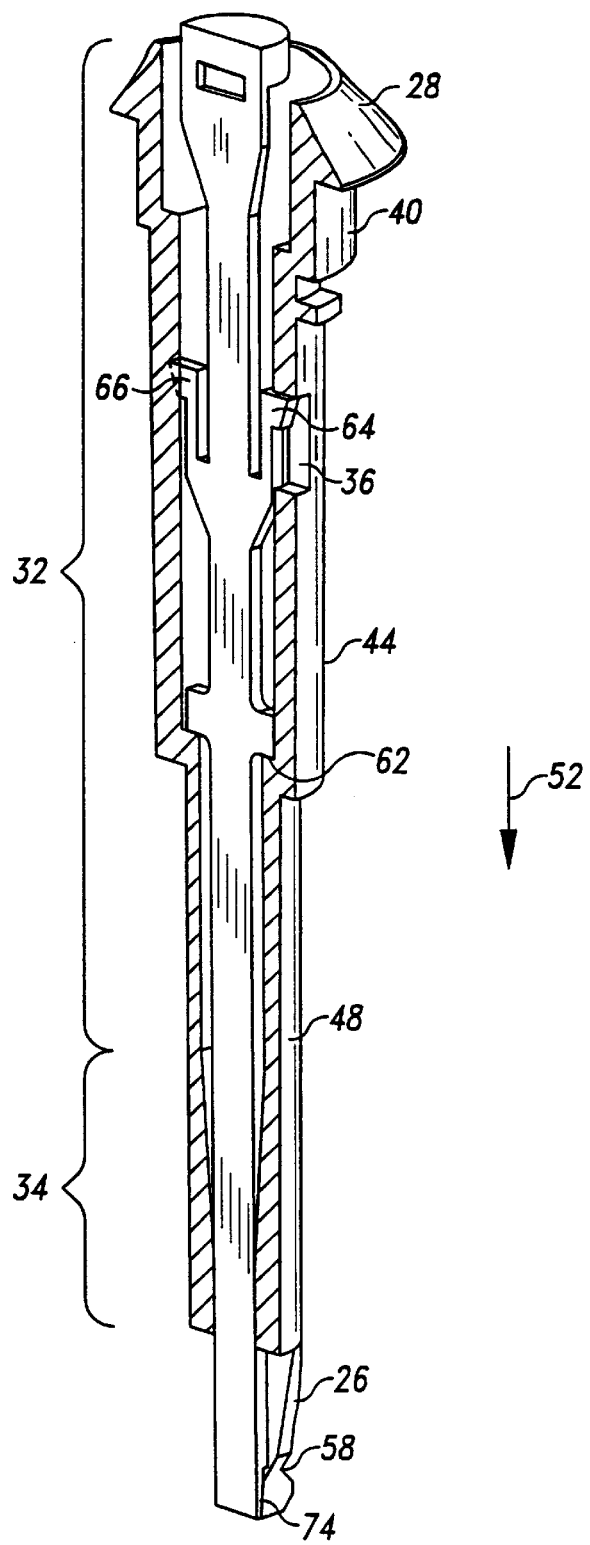
FIG. 7 is a cross sectional view taken along the line 7—7 of FIG. 6, as viewed in the direction of the arrows.

The shaft bore 30 extends through the control shaft 16 from the control shaft base end 28 through the spring barbs arms 26. As shown in FIG. 7, a first portion 32 of the shaft bore 30 is cylindrically shaped, whereas a second portion 34 of the shaft bore 30 is rectangularly shaped. The diameter of the cylindrically-shaped portion 32 of the shaft bore 30 changes at the intersection between the second cylindrical shaped section 44 of the control shaft 16 and the third cylindrical shaped section 48 of the control shaft 16. Specifically, the diameter of the cylindrically-shaped portion 32 of the shaft bore 30 which extends through the control shaft base end 28, the first cylindrical shaped section 40, and the second cylindrical shaped section 44 is larger than the diameter of the cylindrically-shaped portion 32 of the shaft bore 30 which extends into the third cylindrical shaped section 48 of the control shaft 16, thus creating an interior ridge 62. The interior ridge 62 prevents the over-insertion of the locking pin 18 in the axial direction 52.

The rectangularly-shaped portion 34 of the shaft bore 30 is provided to ensure proper alignment of the locking pin 18 when the pin 18 is inserted into the shaft bore 30. In particular, the locking pin 18 is rectangularly shaped with a rectangularly shaped cross-sectional area. As such, the locking pin 18 is only positionable in the rectangularly-shaped portion 34 of the shaft bore 30 in one of two orientations which are 180 degrees apart from one another (as opposed to four orientations if the pin 18 and bore portion 34 were configured square in shape or a unlimited number of orientations if the pin 18 and the bore portion 34 were configured cylindrical in shape). As shall be discussed below in greater detail, the locking pin 18 is symmetrical in shape and therefore may be inserted into the shaft bore 30 in either one of two orientations and still remain desirably locked within the bore 30.

The locking pin 18 includes a locking pin shaft 82, a first retention member 64, a second retention member 66, a first locking pin stop 68, a second locking pin stop 70, a locking pin base end 72, and a tapered end 74. The first retention member 64 and the second retention member 66 are secured to the locking pin shaft 82 and are positioned 180 degrees apart. Such positioning of the retention members 64, 66 (i.e. 180 degrees apart from one another) provides for the aforedescribed symmetrical design of the locking pin 18 thereby allowing the locking pin 18 to be inserted into the shaft bore 30 in either one of two orientations.

The first retention member 64 includes a first spring member 76. The first spring member 76 is secured to the first retention member 64 and extends in a direction parallel to the locking pin shaft 82. The tip 90 of the first spring member 76 extends outwardly away from the locking pin shaft 82. Additionally, the tip of the first spring member 76 is slanted such that the top 92 of the tip is longer than the bottom 94 of the tip. The first spring member 76 is received into the opening 36 of the control shaft 16 when the locking pin 18 is inserted into the bore 30 of the control shaft 16.

The second retention member 66 includes a second spring member 78. The second spring member 78 is secured to the second retention member 66 and extends in a direction parallel to the locking pin shaft 82. The tip 96 of the second spring member 78 extends outwardly away from the locking pin shaft 82. Additionally, the tip of the second spring member 78 is slanted such that the top 98 of the tip is longer than the bottom 100 of the tip. The second spring member 78 is biased against the inner surface of the control shaft 16 when the locking pin 18 is inserted into the bore 30 of the control shaft 16.

The first locking pin stop 68 is located on the locking pin shaft 82 between the first retention member 64 and the tapered end 74. The second locking pin stop 70 is located on the locking pin shaft 82 between the second retention member 66 and the tapered end 74. The first locking pin stop 68 and second locking pin stop 70 are 180 degrees apart. During insertion of the locking pin 18 the first locking pin stop 68 and the second locking pin stop 70 contact the interior ridge 62 of the control shaft 16 thus preventing over-insertion of the locking pin 18.

The locking pin 18 has a tapered end 74 which facilitates insertion of the locking pin 18 between the spring arm barbs 54 of the control shaft 16. When inserted, the tapered end 74 of the locking pin 18 forces the spring arms 26 outward such that the surfaces defined by the v-shaped notch 58 defined in the spring arm barbs 54 are urged outwardly against the control knob seats 60.

The control knob 14 is secured to the control shaft 16 by first inserting the spring arms 26 of the control shaft 16 into the slot 20 of the control knob 14. The tapered end 74 of the locking pin 18 is then inserted into the shaft bore 30 of the control shaft 16 at the control shaft base end 28. The locking pin 18 is advanced in the axial direction 52 until the tapered end 74 forces the spring arm barbs 54 against the control knob seat 60. For the locking pin 18 to be fully inserted into the control shaft 16 the rectangular shaped tapered end 74 must be aligned with the rectangular shaped gap defined between the spring arm barbs 54. When the locking pin is so aligned, the first spring member 76 will be aligned with and received by the opening 36 of the control shaft 16. Additionally, the first locking pin stop 68 and the second locking pin stop 70 will contact the interior ridge 62 of the control shaft bore 30.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

There are a plurality of advantages of the present invention arising from the various features of the appliance timer described herein. It will be noted that alternative embodiments of the appliance timer of the present invention may not include all of the features described yet still benefit from at least some of the advantages of such features. Those of ordinary skill in the art may readily devise their own implementations of an appliance timer that incorporate one or more of the features of the present invention and fall within the spirit and scope of the present invention as defined by the appended claims.

What is claimed is:

1. A control shaft and knob assembly, comprising:
   a control knob having a slot defined therein;
   a control shaft which (i) has a bore extending therethrough, (ii) includes a spring arm which is positionable within said slot of said control knob, and (iii) has an opening defined in a sidewall thereof; and
   a locking pin having a first retention member secured thereto, said locking pin being positionable in said bore of said control shaft, wherein when said locking pin is positioned in said bore of said control shaft (i) said locking pin is positioned to inhibit inward deflection of said spring arm, and (ii) said first retention member is received into said opening defined in said sidewall of said control shaft.

2. The control shaft and knob assembly of claim 1, wherein:
   said control shaft has an outer surface and an inner surface;
   said bore is defined in said inner surface of said control shaft; and
   said opening extends from said outer surface of said control shaft to said inner surface of said control shaft so as to extend to said bore of said control shaft.

3. The control shaft and knob assembly of claim 2, wherein:
   said first retention member extends from a first side of said locking pin;
   said locking pin further has a second retention member which extends from a second side thereof; and
   said second retention member contacts said inner surface of said control shaft when said locking pin is positioned in said bore of said control shaft.

4. The control shaft and knob assembly of claim 3, wherein:
   said first retention member includes a first spring member;
   said second retention member includes a second spring member;
   said first spring member is received into said opening of said control shaft when said locking pin is positioned in said bore of said control shaft; and
   said second spring member is biased against said inner surface of said control shaft when said locking pin is positioned in said bore of said control shaft.

5. The control shaft and knob assembly of claim 1, wherein said locking pin is positioned in contact with said spring arm when said locking pin is positioned in said bore of said control shaft.

6. The control shaft and knob assembly of claim 1, wherein said locking pin is substantially rectangular in cross sectional shape.

7. A control shaft and knob assembly, comprising:
   a control knob having a slot defined therein;
   a control shaft which (i) has a bore extending therethrough from a first end of said control shaft to a second end of said control shaft, (ii) includes a spring arm which is positionable within said slot of said control knob, and (iii) has an opening defined in a sidewall thereof at a location intermediate said first end and said second end; and a locking pin having a first retention member secured thereto, said first retention member includes a first spring member, said locking pin being positionable in said bore of said control shaft, wherein when said locking pin is positioned in said bore of said control shaft (i) said locking pin is positioned to inhibit inward deflection of said spring arm, and (ii) said first spring member is received into said opening defined in said sidewall of said control shaft.

8. The control shaft and knob assembly of claim 7, wherein:

said control shaft has an outer surface and an inner surface;

said bore is defined in said inner surface of said control shaft;

said recess defines an opening which extends from said outer surface of said control shaft to said inner surface of said control shaft so as to extend to said bore of said control shaft.

9. The control shaft and knob assembly of claim 7, wherein:

said first retention member includes a first spring member, said locking pin further has a second spring member, said first spring member is positioned in said recess when said locking pin is positioned in said bore of said control shaft, and said second spring member is biased against an inner surface of said bore of said control shaft when said locking pin is positioned in said bore of said control shaft.

10. The control shaft and knob assembly of claim 9, wherein said locking pin is positioned in contact with said first spring arm when said locking pin is positioned in said bore of said control shaft.

11. The control shaft and knob assembly of claim 7, wherein said locking pin is substantially rectangular in cross sectional shape.

12. A control shaft and knob assembly, comprising:

a control knob having a slot defined therein;

a control shaft having a first end and a second end and a sidewall extending therebetween, said sidewall defining a bore, and said sidewall having an opening defined therein that is spaced apart from both said first end and said second end, and said control shaft further having a spring arm that is positionable within said slot of said control knob; and a locking pin having a first retention member secured thereto, said locking pin being positionable in said bore of said control shaft, wherein when said locking pin is positioned in said bore of said control shaft (i) said locking pin is positioned to inhibit inward deflection of said spring arm, and (ii) said first retention member is received into said opening defined in said sidewall of said control shaft.

13. The control shaft and knob assembly of claim 12, wherein:

said sidewall of said control shaft has an outer surface and an inner surface;

said bore is defined by said inner surface of said sidewall; and said opening extends from said outer surface to said inner.

14. The control shaft and knob assembly of claim 13, wherein:

said first retention member extends from a first side of said locking pin;

said locking pin further has a second retention member which extends from a second side of said locking pin; and said second retention member contacts said inner surface of said sidewall of said control shaft when said locking pin is positioned in said bore of said control shaft.

15. The control shaft and knob assembly of claim 14, wherein:

said first retention member includes a first spring member;

said second retention member includes a second spring member;

said first spring member is received into said opening defined in said sidewall of said control shaft when said locking pin is positioned in said bore; and said second spring member is biased against said inner surface of said sidewall when said locking pin is positioned in said bore.

16. The control shaft and knob assembly of claim 12, wherein said locking pin is positioned in contact with said spring arm when said locking pin is positioned in said bore of said control shaft.

17. The control shaft and knob assembly of claim 12, wherein:

said locking pin includes a distal portion that contacts said spring arm when said locking pin is positioned in said bore of said control shaft, and said first retention member is spaced apart from said distal portion of said locking pin.

* * * * *